R. WOOD.
FLANGE LUBRICATOR.
APPLICATION FILED JUNE 19, 1916.
1,205,306.
Patented Nov. 21, 1916.
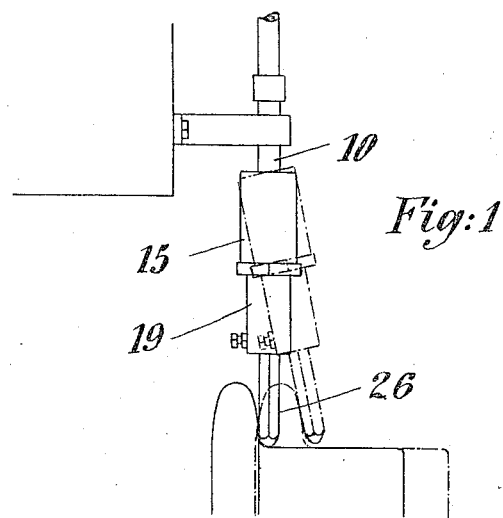
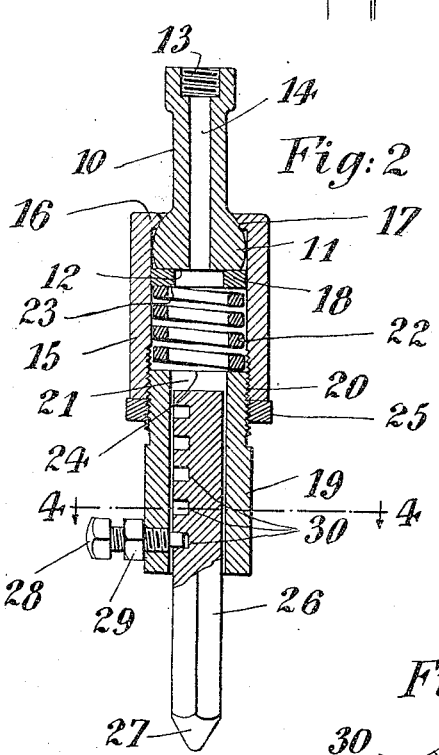
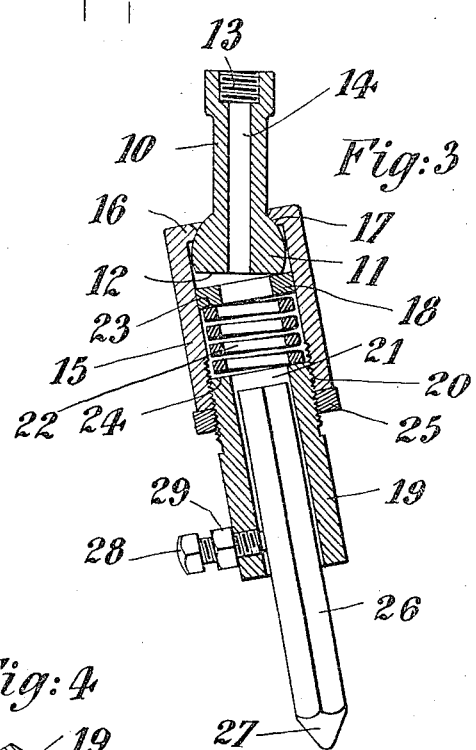
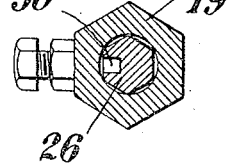
WITNESSES:
Florence Calhoun
A. B. Rubin
INVENTOR
Robert Wood
BY Walter E. Wollheim
ATTORNEY.

UNITED STATES PATENT OFFICE.

ROBERT WOOD, OF BROOKLYN, NEW YORK, ASSIGNOR TO THE NATHAN MANUFACTURING COMPANY, OF NEW YORK, N. Y., A CORPORATION OF NEW YORK.

FLANGE-LUBRICATOR.

1,205,306.  Specification of Letters Patent.  Patented Nov. 21, 1916.

Application filed June 19, 1916. Serial No. 104,509.

*To all whom it may concern:*

Be it known that I, ROBERT WOOD, a subject of the King of Great Britain and Ireland, residing at Brooklyn, in the county of Kings and State of New York, have invented certain new and useful Improvements in Flange-Lubricators, of which the following is a specification.

This invention relates to discharge nozzles used in connection with flange lubricators and has for its particular object simple means for the direction of the lubricant toward that part of the wheel flange which is to be lubricated.

Another object of the invention is the elimination of parts in a device of this character, without sacrificing any of its desirable features, whereby the cost of production of the same is greatly reduced.

In a device of this nature which is usually subjected to spasmodic vibrations, it is difficult to always insure the supply of oil reaching its destination, which is the fillet between the flange and the tread of the wheel, owing to the swaying character of these vibrations. In the device described in the following specification and illustrated in the accompanying drawings I have embodied such features as will positively keep the end of the discharge nipple in the same fixed relation to the wheel flange at all times.

In the drawings, Figure 1 shows a diagrammatic view of my invention; Fig. 2 shows a longitudinal sectional view of the discharge device; Fig. 3 is a sectional view similar to the one shown in Fig. 2, but with the device in slightly tilted position; Fig. 4 is a cross sectional view along the plane of line 4—4 in Fig. 2.

Like characters of reference denote similar parts throughout the several views and the following specification which illustrates a preferred embodiment of my invention.

My device consists, broadly speaking, of a ball and socket joint, a feed rod and a spring coöperating with both, as will now be more fully explained.

10 is a member, terminating in a ball shaped portion 11, which is flattened at 12. The opposite end of member 10 is threaded at 13 to receive an oil pipe for connection with a suitable oil reservoir (not shown).

14 is a bore extending through the member 10.

15 is a tubular member, having an inturned flange 16, which is ground at 17 to fit the spherical portion 11 of member 10, thus forming a ball and socket joint, of which 10 is the ball member and 15 the socket member.

18 is a tubular washer, slidably fitting the interior of socket member 15.

19 is an extension which is threaded at 20, to engage corresponding threads at the interior of socket 15.

21 is a cylindrical bore through extension 19.

22 is a helical spring adapted to rest and exert tension against, respectively, face 23 of washer 18 and face 24 of extension 19. Below thread 20, the contour of extension 19 is preferably of polygonal shape, so as to permit ready application of a suitable wrench for screwing the extension in or out of socket 15, to vary the tension of the spring 22. A locknut 25 is provided to fixedly secure the extension 19 in any desired position and prevent accidental dislodgment therefrom.

A rod 26 is slidably arranged within the bore 21 of extension 19, which rod is preferably of polygonal cross section, for reasons set forth hereafter. One end of rod 26 is rounded, as shown at 27.

28 is a set screw, equipped with a lock-nut 29; this set screw projects through the walls of extension 19 to be brought to register with any one of holes 30 provided in rod 26, for the obvious purpose of adjusting the distance which rod 26 projects out of extension 19.

In operation, when mounted on a locomotive, for instance, my device is adjusted so that the end 27 of feed rod 26 rests against the fillet between the flange and the tread of the wheel, when the wheel is approximately at the innermost limit of its transverse movement, due to the oscillations of the engine or other causes, as shown in Fig. 1. In the same figure, in dotted lines, I have indicated the wheel in its outermost position, in which the flange of the wheel forces the end of the nozzle, below the ball joint, to assume the angle, also shown in dotted lines, in Fig. 1. In either position, oil will pass through conduits 14 and 21, along the flats of the feed rod 26, to the point against which the tip 27 rests, whence by centrifugal action the oil is distributed over the entire flange, thereby effectively minimizing the flange wear. Whenever swaying movements or other vibrations cause this device to assume the angle shown in dotted lines in Fig. 1 and more specifically in Fig. 3, it can readily be seen that the cam action of the edge formed by surfaces 11 and 12 of ball member 10 against the face of washer 18, in conjunction with spring 22, which is then under great tension, will force the device to return to its original position, insuring close proximity between tip 27 of rod 26 and fillet of the wheel flange. The tension of the spring, as mentioned above, can be varied by screwing the extension 19, respectively, in or out, as desired. The length of the feed rod 26 can be easily adjusted by unscrewing set screw 28 and bringing the same in engagement with any desired hole 30.

It is obvious from the foregoing description that all of the working parts of my device particularly the spring, are inclosed, and well lubricated, being directly in the path of the oil, which insures proper performance of the functions of the various component elements of my device.

In reduction to practice, I have found that the form of my invention illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What I claim as new, is:

1. The combination with a flange oiler, of an oil conduit comprising a ball and socket joint, a feed rod, and resilient means, in axial alinement with said feed rod, adapted to hold said feed rod in fixed relation to a wheel flange.

2. A discharge device, in combination with a flange oiler, comprising a ball and socket coupling, a feed rod, said ball and socket coupling being adapted to convey a lubricant to the said feed rod, and resilient means in axial alinement with said feed rod, coacting with said ball and socket coupling, to hold said feed rod in fixed relation to a wheel flange.

3. In combination with a flange oiler, an oil discharge medium consisting of two tubular members forming a ball and socket joint, a feed rod, and resilient means within and in axial alinement with one of said tubular members adapted to hold said feed rod in fixed relation to a wheel flange.

4. A discharge nozzle for a flange oiler comprising a universal pipe coupling consisting of a ball member and a socket member, a feed rod adjustably secured to the said socket member, and resilient means within the said socket member and coacting with the said ball member, adapted to maintain the said feed rod in fixed relation to a wheel flange.

5. In a discharge nozzle for a flange oiler, the combination of a ball member and a socket member forming a universal pipe coupling, a feed rod adjustably secured to the said socket member, and means within the said socket member adapted to force said coupling and feed rod into axial alinement.

6. In combination with a flange oiler, a discharge nozzle, comprising a ball member and a socket member forming a universal pipe coupling, a helical spring within the said socket member, a washer interposed between the said ball member and the said spring, a tubular extension screwed into the said socket member, adapted to vary the tension of the said spring, and a feed rod adjustably secured to the said extension.

7. In combination with a flange oiler, a discharge nozzle, comprising a ball member and a socket member forming a universal pipe coupling, a helical spring within the said socket member, a washer interposed between the said ball member and the said spring, a tubular extension screwed into the said socket member, adapted to vary the tension of the spring, a feed rod slidably secured within the said tubular extension, the said feed rod being provided with flattened sides, permitting the passage of a lubricant through the said tubular extension.

8. In combination with a flange oiler, an oil discharge device comprising a ball member and a socket member forming a universal pipe coupling, a tubular extension screwed into the said socket member, a feed rod slidably secured within the said tubular extension, and means, within the said socket member, adapted to force said coupling and feed rod into axial alinement.

9. A discharge nozzle for a flange oiler comprising a universal pipe coupling consisting of a ball member and a socket member, a feed rod adjustably secured to the said socket member, and resilient means, within the said socket member and coaxially arranged therewith, adapted to force said coupling and feed rod into axial alinement, and to simultaneously maintain the said ball and socket members in fluid tight relation to each other.

In testimony whereof I have hereunto set my hand in presence of two subscribing witnesses.

ROBERT WOOD.

Witnesses:
 FLORENCE CALHOUN,
 ABRAHAM RUBIN.